United States Patent [19]

Shimojo et al.

[11] Patent Number: 4,790,738
[45] Date of Patent: Dec. 13, 1988

[54] INJECTION MOLD HAVING ROTATABLE STAMPER HOLDING RING

[75] Inventors: Shunichi Shimojo, Aichi; Ikuo Asai, Nagoya, both of Japan

[73] Assignee: 501 Meiki Co., Ltd., Ohbu, Japan

[21] Appl. No.: 123,019

[22] Filed: Nov. 19, 1987

[30] Foreign Application Priority Data

Nov. 20, 1986 [JP] Japan .................. 61-277524

[51] Int. Cl.[4] ............................................. B29C 33/30
[52] U.S. Cl. ................... 425/192 R; 249/103; 425/195; 425/451.9; 425/810; 264/106
[58] Field of Search ............ 425/185, 190, 192 R, 425/193, 195, 589, 451.9, 810; 249/102-104, 160; 264/106, 107

[56] References Cited

U.S. PATENT DOCUMENTS 1,916,996  7/1933  Somner ......................... 425/810
4,741,689  5/1988  Onizawa et al. ................. 249/160

FOREIGN PATENT DOCUMENTS 58-58214   3/1983  Japan .
59-230731 12/1984  Japan .
60-48313   3/1985  Japan ................... 425/810

Primary Examiner—Jay H. Woo
Assistant Examiner—James C. Housel
Attorney, Agent, or Firm—Frank J. Jordan; C. Bruce Hamburg; Manabu Kanesaka

[57] ABSTRACT

An injection mold for disc molding such as in the manufacture of video or audio discs. The mold has a stamper removably clamped to one mold half by a rotating stamper holding ring. Both mold halves contain a plurality of clamping pins which selectively engage and hold slots in the holding ring. By rotating the holding ring, disengagement of the ring with the pins of the mold half carrying the stamper occurs simultaneously with engagement of the ring with the pins of the other mold half. Thereby, the stamper is released and may then be replaced.

9 Claims, 4 Drawing Sheets

INJECTION MOLD HAVING ROTATABLE STAMPER HOLDING RING

BACKGROUND OF THE INVENTION AND RELATED ART STATEMENT

This invention relates to an improved mold for disc molding and more particularly to an apparatus for holding a stamper in which video or audio signals are memorized with or without grooves.

Japanese published patent application No. 58-58214 and Japanese laid open patent No. 59-230731 relate to injection mold apparatus. In these inventions, a stamper is clamped in a cavity so that an outer stamper holder holds an outer periphery of the stamper and an inner stamper holder holds an inner periphery of the stamper. When discs are formed by injection molding in a factory, several kind of discs are formed by injection molding in a day, and consequently stamper is changed several times a day. In some factories, the stamper is changed 5–6 times in a day.

In the prior art, when changing the stamper, the stamper is held by the hands of a worker. Namely, after opening mold halves and unfastening bolts which tightens the outer stamper holder to outer periphery of the stamper, the outer stamper holder is removed from the mold half. As the surface of the cavity of a disc mold is finished such as a mirror surface, scratch is easily formed. Therefore, when removing the outer stamper holder, careful working is required. As a result, it takes time to change the stamper. In case scratches are formed, it brings bad effect in transcribing the information on the video, audio memory disc. It is impossible to mold the disc with fine video or memory.

It is, therefore, an object of the present invention to provide an improved injection molding machine for molding discs, which permits to detach and install automatically the outer stamper holder.

SUMMARY OF THE INVENTION

According to the present invention, an injection molding apparatus comprises a stamper installed removably on the surface of a movable mold cavity of one mold half, an outer stamper holder assembly to hold the stamper on the surface of the movable mold cavity at the outer periphery of the stamper, means to clamp the outer stamper holder assembly to the movable mold half, and means to remove and clamp the outer stamper holder assembly to the surface of a stationary mold half.

BRIEF DESCRIPTION OF THE DRAWING

FIG. 5 is an enlarged fragmentary view of the outer stamper holder; and

FIG. 6 is an enlarged fragmentary view taken along line VI—VI in FIG. 2.

DETAILED DESCRIPTION OF A PREFERRED EMBODIMENT

Figure 1:
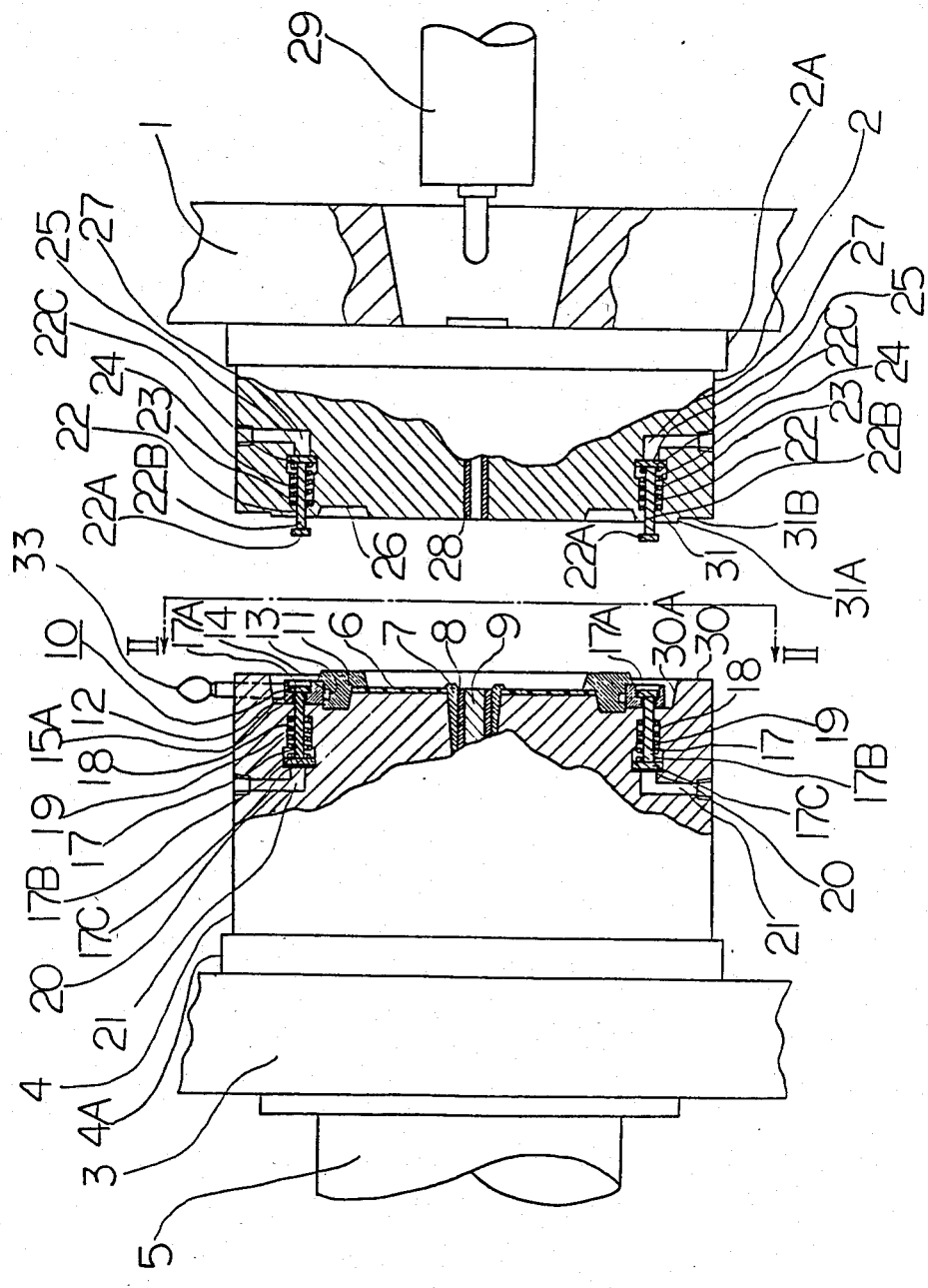
FIG. 1 is a partly cross sectional elevation view showing a mold opening status of a mold assembly of an injection molding machine for disc-forming of the present invention.

Referring to FIG. 1, a mold assembly comprises a stationary platen 1 fixed on a bed of an injection molding machine and a movable platen 3. A stationary mold half 2 with a setting plate 2A is fixed to the stationary platen 1. The movable platen 3 is arranged to move forwardly and backwardly relative to the stationary platen 1. A movable mold half 4 with a setting plate 4A is fixed to the movable platen 3. Numeral 5 designates a ram which advances or retracts the movable platen 3.

Referring to the illustration of the movable mold half 4, numeral 6 designates a stamper in which innumerable pits with information are electroplated from a mother stamper. Numeral 7 designates an inner stamper holder which holds the inner periphery of the central aperture of the stamper 6 to be fixed to the cavity of the movable mold half 4. The cavity is formed of or surrounded by a stainless steel in order to finish the surface like a mirror. The order of finishing the surface is required to 0.01 micron order.

An ejector collar 8 for ejecting molded discs and a punch 9 for forming an aperture of the disc are concentrically situated in the center portion of the inner stamper holder 7. The ejector collar 8 and punch 9 can be moved back and forth. An outer stamper holder assembly 10 for clamping the stamper 6 to the cavity surface is composed of an outer stamper holder ring 11, three guide plates 14 and a rotating ring 12. There is provided a groove 13 on the periphery of the outer stamper holder ring 11. The outer periphery of the outer stamper holder ring 11 is inserted rotatably in the inner periphery of the rotating ring 12. Each tip portion of the guide plate 14 which penetrates from the outer periphery to the inner periphery of the rotating ring 12 is fitted in the groove 13 on the periphery of the outer stamper holder ring 11 to prevent the rotating ring 12 from slipping out of the outer periphery of the outer stamper holder ring 11.

Figure 2:
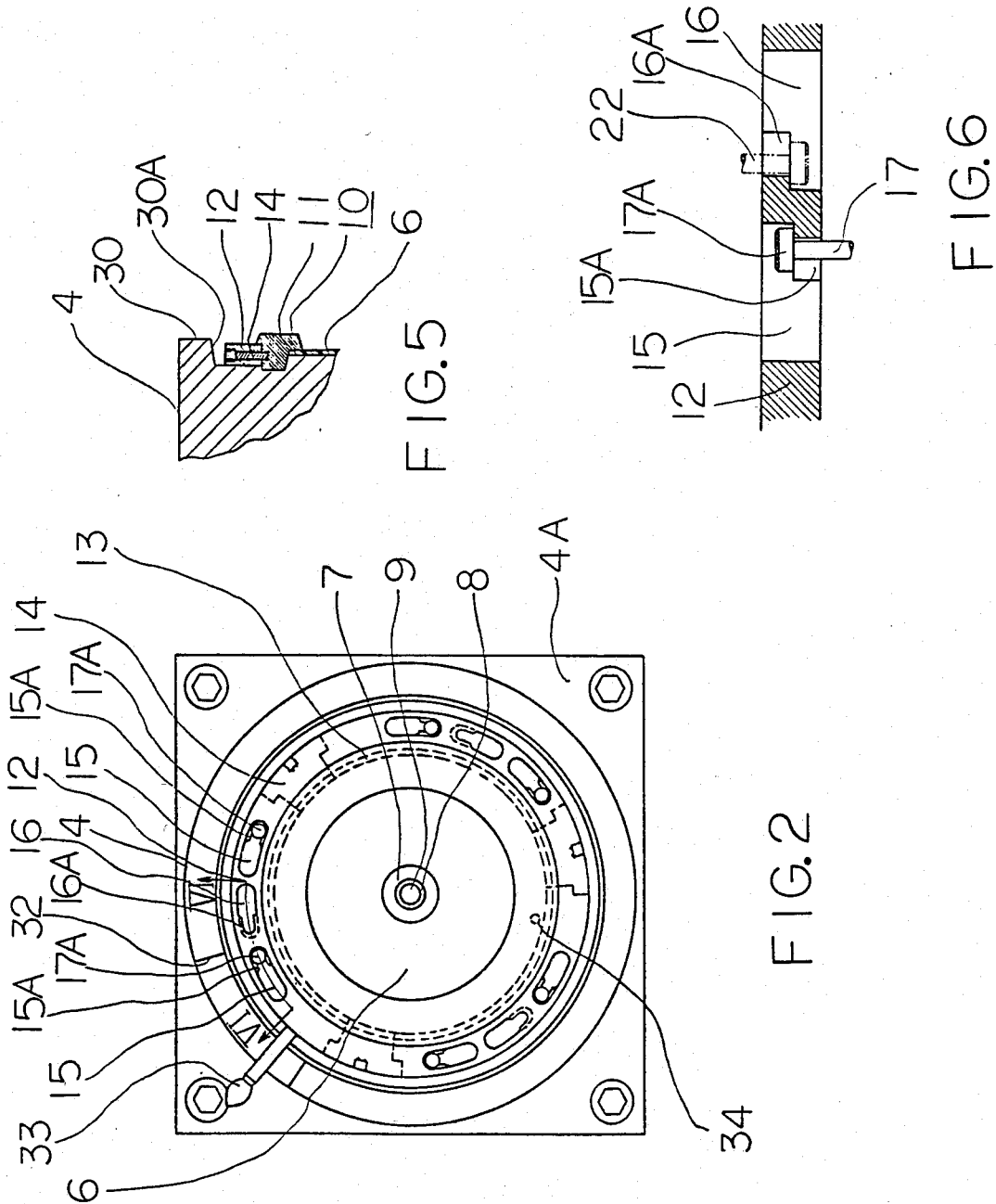
FIG. 2 is a section view taken along line II—II in FIG. 1.

There are provided three pairs of arcuate slots 15, 16 in the rotating ring 12 as shown in FIG. 2. The arcuate slots 16 are positioned between the two arcuate slots 15. The width of the right side portion 15A of the arcuate slot 15 is shorter than the width of the left side portion, and the width of the left side portion 16A of the arcuate slot 16 is shorter than the width of the right side portion, as shown in FIG. 2.

Clamping pins 17 are mounted in the movable mold half 4 for clamping the outer stamper holder assembly 10 in order to hold the stamper 6 in the mold cavity. Springs 19 are provided in spring chambers 18 to urge the respective clamping pins 17 in the left direction in FIG. 1. Numeral 17A designates a head of the clamping pin 17, numeral 17B designates a shank of the clamping pin 17, and numeral 17C designates a piston portion of the clamping pin 17. The respective heads 17A of the clamping pins 17 can be inserted into the respective arcuate slots 15, and the respective shanks 17B can be located in the respective right side portions 15A of the arcuate slots 15 as shown in FIG. 6.

There are provided air cylinder chambers 20 which actuate the clamping pins 17 in the movable mold half 4. For that purpose, the respective piston portions 17C of the clamping pins 17 are located in the air cylinder chambers 20. The clamping pin 17 can be moved to the right direction in FIG. 1 by compressed air introduced in the air cylinder chamber 20 through air passage 21.

Referring to the illustration of the stationary mold half 2, clamping pins 22 are provided in the stationary mold half 2. Each clamping pin 22 is urged to the right direction in FIG. 1 by a spring 24 situated in the stationary mold half 2. Numeral 22A designates a head of the clamping pin 22, numeral 22B designates a shank of the clamping pin 22, and numeral 22C designates a piston portion of the clamping pin 22. The respective heads 22A of the clamping pins 22 can be inserted into the respective arcuate slots 16, and the respective shanks 22B can be located in the respective left side portions 16A of the arcuate slots 16 as shown in FIG. 2. The respective clamping pins 22 can be moved to the left direction in FIG. 1 by compressed air introduced in air cylinder chambers 25 through air passages 27.

A circular concave 26 is formed on a cavity surface of the stationary mold half 2 to permit the outside of the outer stamper holder ring 11 to be located therein when the mold halves are clamped. A sprue bushing 28 is provided in the center of the stationary mold half 2, through which melted plastic material is injected into the mold cavity. Numeral 29 designates a heating barrel, in which plastic material is plasticized to be injected.

An outer ring 30 formed on the movable mold half 4 has a tapered inner surface 30A, which receives a tapered outer surface 31A of a convex portion 31 of the stationary mold half 2 when the mold halves are clamped together. The concentricity between the stationary mold half 2 and the movable mold half 4 is kept by the tapered inner surface 30A and the tapered outer surface 31A when clamped together. The depth of the cavity which decides the thickness of molded disc is determined by the degree of the depth between the front surface of the outer ring 30 and the front surface 31B of the stationary mold half 2.

A space 32 is provided in a portion of the outer ring 30. A handle 33 is fixed to the outer periphery of the rotating ring 12 to rotate the rotating ring 12 in the space 32. Numeral 34 designates a pin to prevent the rotation of the stamper 6.

Figure 3:
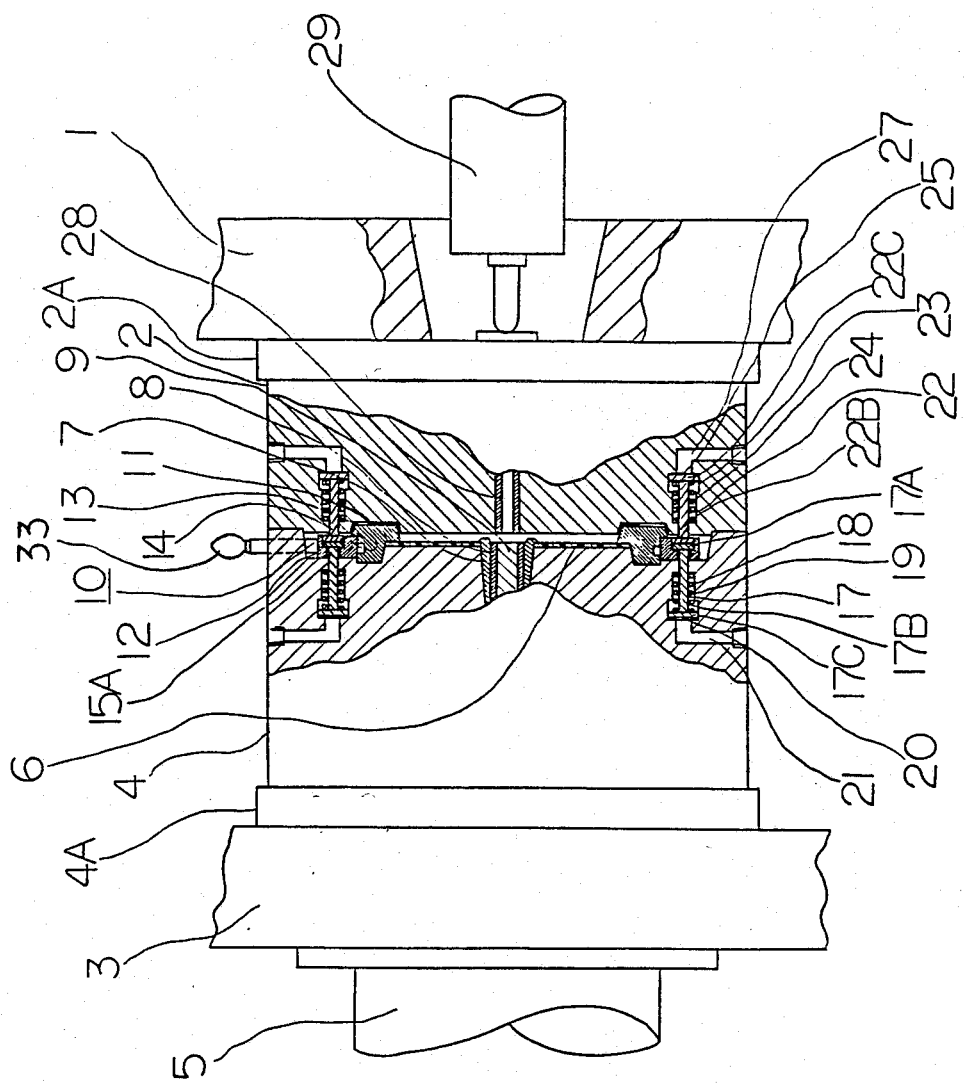
FIG. 3 is a partly cross sectional elevation view showing a mold closing status of a mold assembly of an injection molding machine of the present invention.
Figure 4:
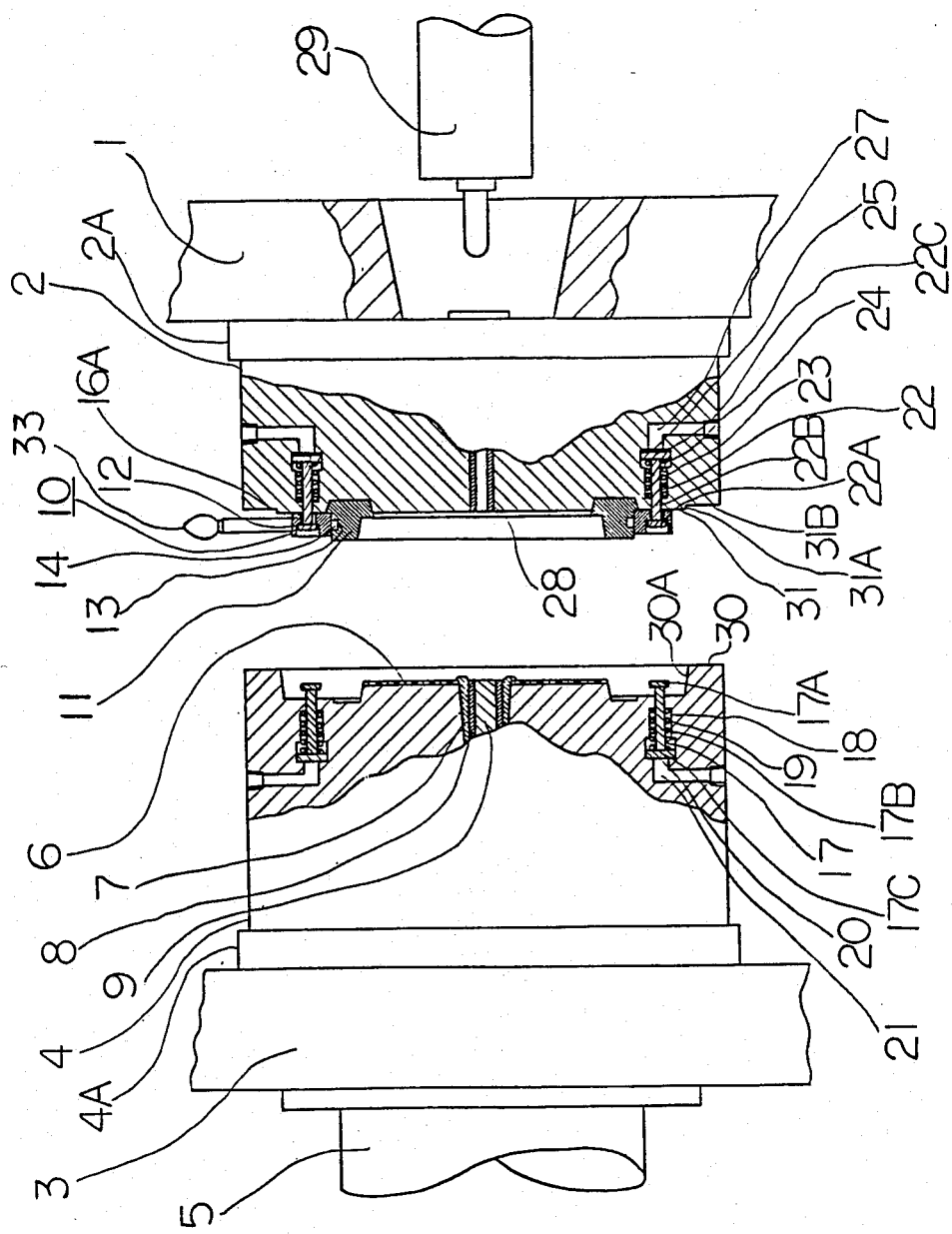
FIG. 4 is a partly cross sectional elevation view showing a mold opening status of a mold assembly of an injection molding machine of the present invention in which an outer stamper holder is detached from a cavity of a mold half.

In operation, the stamper 6 is clamped on the cavity surface of the movable mold half 4 by means of the inner stamper holder 7 and outer stamper holder assembly 10. The movable mold half 4 is moved adjacent to the stationally mold half 2 as shown in FIG. 3. In this condition, molten plastic material for discs retained in the heating barrel 29 is ejected through the sprue bushing 28 to the mold cavity formed between the stationary mold half 2 and the movable mold half 4. The plastic material is ejected into the cavity at a pressure of 500 Kg/cm$^2$-1,000 Kg/cm$^2$. The mold halves are retained for a while to cool the plastic material in the cavity. After the plastic material is cooled, the movable mold half 4 is moved backwardly relative to the stationary mold half 2 to open the cavity for removing the molded disc. Then, the movable mold half 4 is moved forwardly to abut against the stationary mold half 2, and next molding is made. After the discs of predetermined quantity are molded, the mold halves are clamped for changing the stamper 6 so as to mold the other kind of discs.

When changing the stamper 6, the clamping pin 17 and 22 are moved forwardly against the respective spring force of the springs 19 and 24 by actuating the compressed air to the air cylinders 20 and 25 through the air passages 21 and 27. Moving the clamping pin 17 and 22 permits the shanks 22B of the clamping pins 22 of the stationary mold half 2 to be inserted into the side portions 16A of the arcuate slots 16 by the operation of the handle 33. Compressed air to the air passages 21 and 27 is stopped after operation of the handle 33, wherein the outer stamper ring assembly 10 is fixed to the stationary mold half 2 by the spring force of the springs 24. Then, the mold halves are opened to detach the stamper by hand.

The stamper 6 supported by the inner stamper holder is changed to a new stamper 6. After the new stamper 6 is installed in the movable mold half 4, the mold halves are clamped. Then, the rotating ring 12 is rotated in the counterclockwise direction in FIG. 2 by the handle 33 so as to clamp the outer stamper holder assembly 10 to the cavity surface of the movable mold half 4. After the stamper 6 has been clamped, next disc molding starts.

While the invention has been explained with reference to the specific embodiment of the invention, the explanation is illustrative and the invention is limited only by the appended claims.

What is claimed is:

1. An injection molding apparatus comprising;
   first and second mold halves having first and second mold cavities respectively therein, at least one of said first and second mold halves being movable relative to the other to open and close the mold halves;
   a stamper removably disposed in the first mold cavity;
   outer stamper holding means for holding an outer edge portion of the stamper relative to the first mold half;
   first clamping means situated in the first mold half, said first clamping means releasably engaging the outer stamper holding means for immovably fixing the outer stamper holder means and the stamper to the first mold half and disengaging from the outer stamper holding means when the stamper is changed; and
   second clamping means situated in the second mold half, said second clamping means engaging and holding the outer stamper holding means only when the outer stamper holding means is released from the first clamping means, said outer stamper holding means including means for selectively engaging the outer stamper holding means with one of the clamping means while disengaging the outer stamper holding means from the other clamping means.

2. An injection molding apparatus according to claim 1, further comprising inner stamper holding means for holding an inner periphery of the stamper relative to the first mold half.

3. An injection molding apparatus according to claim 2, in which said outer stamper holding means further includes an outer stamper holding ring to engage the outer edge portion of the stamper, and said selective engaging and disengaging means is a rotating ring attached to the outer stamper holding ring and having a plurality of first and second slots therein, said first slots engaging the first clamping means in a first position and said second slots engaging the second clamping means in a second position.

4. An injection molding apparatus according to claim 3, in which said first clamping means includes a plurality of first pins with heads, first springs attached to the respective first pins to urge the first pins to move inside the first mold half, and first operating devices attached to the respective first pins to move the first pins outwardly against the first springs, and said second clamping means includes a plurality of second pins with heads, second springs attached to the respective second pins to urge the second pins to move inside the second mold half, and second operating devices attached to the respective second pins to move the second pins outwardly against the second springs.

5. An injection molding apparatus according to claim 4, in which said first slots include a first wide open portion and a first narrow open portion, said head of the first pin passing through the first wide open portion and being prevented from passing through the first narrow open portion, and said second slots include a second wide open portion and a second narrow open portion, said head of the second pin passing through the second wide open portion and being prevented from passing through the second narrow open portion.

6. An injection molding apparatus according to claim 5, in which orientation of the first slots are positioned between the second slots so that only the first pins engage and hold the rotating ring in said first position and only the second pins engage and hold the rotating ring in said second position.

7. An injection molding apparatus according to claim 6, in which said outer stamper holding means further includes a handle to rotate the rotating ring relative to the first mold half.

8. An injection molding apparatus according to claim 7, in which said first mold half is a movable mold half, and the second mold half is a stationary mold half.

9. An injection molding apparatus according to claim 8, in which said stationary mold half includes a sprue bushing to supply plastic material into the mold cavities, and said movable mold half includes an ejection collar for ejecting molded material.

* * * * *